United States Patent [19]

Sakemi et al.

[11] 4,194,917

[45] Mar. 25, 1980

[54] FIRED CERAMIC HAVING DENSE AND LOW THERMAL EXPANSION CHARACTERISTICS

[75] Inventors: Hiroji Sakemi; Tomohiro Morishita; Hideji Numata; Takuro Ono, all of Yokohama, Japan

[73] Assignee: Asahi Glass Company, Ltd., Tokyo, Japan

[21] Appl. No.: 913,367

[22] Filed: Jun. 7, 1978

[30] Foreign Application Priority Data

Jun. 14, 1977 [JP] Japan ............................ 52-69475

[51] Int. Cl.$^2$ ............... C04B 35/18; C04B 35/20; C04B 35/50
[52] U.S. Cl. .................... 106/62; 106/39.6; 106/39.7; 106/65; 106/73.2; 106/73.33; 106/73.4; 106/73.5
[58] Field of Search ............ 106/73.2, 73.33, 62, 106/65, 39.7, 39.6, 39.5; 252/455 R

[56] References Cited

U.S. PATENT DOCUMENTS

| | | | |
|---|---|---|---|
| 2,731,355 | 1/1956 | Skinner | 106/39.6 |
| 2,880,098 | 3/1959 | Jones | 106/68 |
| 3,423,217 | 1/1969 | Blaha | 106/62 |
| 3,450,546 | 6/1969 | Stong | 106/39.6 |
| 3,818,087 | 6/1974 | Smyser | 264/65 |
| 3,940,255 | 2/1976 | Harrington et al. | 106/39.6 |
| 3,951,670 | 4/1976 | Bush | 106/39.7 |
| 3,958,058 | 5/1976 | Elmer | 106/39.6 |
| 3,993,844 | 11/1976 | Kiger et al. | 106/73.2 |
| 4,011,093 | 3/1977 | Veres | 106/39.7 |
| 4,017,347 | 4/1977 | Cleveland | 106/39.5 |
| 4,063,955 | 12/1977 | Fritsch et al. | 106/39.6 |
| 4,097,293 | 6/1978 | Komeya et al. | 106/73.2 |
| 4,118,240 | 10/1978 | Takabatake | 106/73.2 |
| 4,122,042 | 10/1978 | Meden-Piesslinger et al. | 106/73.2 |

OTHER PUBLICATIONS

Smoke, E. J., "Inorganic Dielectrics Research,"–R & D Technical Report–0232-5, U.S. Army Electronics Command, Dec. 1969, pp. 153–156, pp. 165–171.
Chem. Abstracts–69, (1968), Item 4842y, "Dielectric Constants of Microcrystalline Glasses Containing Compounds of Bismuth, Lead and Cerium."

*Primary Examiner*—Helen M. McCarthy
*Attorney, Agent, or Firm*—Oblon, Fisher, Spivak, McClelland & Maier

[57] ABSTRACT

A fired ceramic having dense and low thermal expansion characteristics comprises 0.3 to 8 wt. % of at least one of rare earth oxides and has a thermal expansion coefficient of less than 0.3% and a porosity of less than 10%.

The fired ceramic having dense and low thermal expansion characteristics comprises a main component of cordierite, lithium aluminosilicates or aluminum titanate.

The rare earth oxide is preferably $Y_2O_3$ and can be $CeO_2$ or $La_2O_3$.

3 Claims, No Drawings

FIRED CERAMIC HAVING DENSE AND LOW THERMAL EXPANSION CHARACTERISTICS

BACKGROUND OF THE INVENTION:

The present invention relates to a fired ceramic having dense and low expansion characteristics and high strength.

Recently, various ceramics have been widely used in industries and in housewares. The condition in the uses of the ceramics become severe and the ceramics having high characteristics have been required in many cases.

The requirement for improving thermal shock resistance of the ceramic has been increased and various efforts for satisfying the requirement have been made.

For example, the strength of the ceramic has been increased so as to overcome a thermal stress caused by a thermal shock or the porosity of the ceramic has been increased to disperse the thermal stress or the extension of crackings in the ceramic has been prevented.

These methods have attained certain effects for satisfying the requirements. However, these methods have not been satisfactory to attain the requirements under severe conditions in the uses of the ceramics.

That is, the degree of increase of strength is limited. Sometimes, the resistance for preventing extension of crackings is weakened because of high strength, and accordingly, the increase of strength is not effective to high degree of thermal shock.

The increase of porosity of the ceramic causes decrease of the strength of the ceramic to limit the scope of the effective uses of the ceramics.

On the contrary, it has been paid attention to the ceramics having low thermal expansion characteristics because the ceramics do not have high thermal stress under severe thermal shock.

From the viewpoints of oxidation resistance at high temperature, oxide type ceramics having low thermal expansion characteristics have been preferably used.

The oxide type ceramic articles having required characteristics have been prepared by using the oxide type ceramics having low thermal expansion characteristics such as lithium aluminosilicates e.g. $\beta$-spodumene ($Li_2O.Al_2O_3.4SiO_2$); cordierite ($2MgO.2Al_2O_3.5SiO_2$) and aluminum titanate ($Al_2O_3.TiO_2$).

However, in the conventional methods using these oxide type ceramics having low thermal expansion characteristics, a binder such as clay has been used in most of the applications from the viewpoints of fabricatability and strength of substrate. Accordingly, in order to prevent a softening in the firing so as to maintain a desired shape, it has been difficult to increase the temperature in the firing. Thus, the resulting fired products have high porosity and have not enough strength.

SUMMARY OF THE INVENTION:

It is an object of the present invention to provide a fired ceramics having dense and low thermal expansion characteristics which have not the above-mentioned disadvantages and have high strength and low thermal expansion coefficient of less than 0.3% and a low porosity of less than 10%.

The foregoing and other objects of the present invention have been attained by providing a fired ceramic having dense and low thermal expansion characteristics which comprises 0.3 to 8 wt. % of at least one of rare earth oxides.

DETAILED DESCRIPTION OF THE PREFERRED EMBODIMENTS:

In accordance with the present invention, the fired ceramics having dense and low thermal expansion characteristics which have low porosity can be obtained by admixing the rare earth component such as Y, La and Ce in the form of an oxide, an organic salt, an inorganic salt or the other with the substance for the ceramic having low thermal expansion coefficient such as lithium aluminosilicates, cordierite and aluminum titanates.

Even though the mixture is fired at relatively low temperature that is at the temperature being capable to prevent the softening or the deformation in the firing, the fired ceramic having dense and low porosity can be obtained.

The resulting fired ceramics of the present invention have excellent electric characteristics such as insulation and can be effectively used as the insulation substrates which are used instead of the known $Al_2O_3$.

The feature of the present invention is to admix at least one of the rare earth components such as rare earth elements e.g. Y, La and and Ce and oxides, organic salts and inorganic salts of the rare earth elements with a ceramic having low thermal expansion coefficient such as lithium aluminosilicates, cordierite and aluminum titanates.

A ratio of the rare earth component as rare earth oxide to the total of the oxide type ceramic and the rare earth component is in a range of 0.3 to 8 wt. % preferably 1 to 4 wt. %.

When the ratio is less than 0.3 wt. %, the effect of the present invention to result high density of the fired ceramic even at relatively lower firing temperature, is not satisfactorily attained.

When the ratio is high than 8 wt. %, the thermal expansion coefficient of the fired ceramic is higher and the effect of the low thermal expansion characteristics can not be attained.

The rare earth component can be admixed in the form of the rare earth element. Thus, it is preferable to uniformly admix the rare earth component in the form of one of oxides, chlorides, sulfates, nitrates and acetates as a solid powder, a solution, a suspension or a slurry with the oxide type ceramic having low thermal expansion characteristics.

The typical oxide type ceramics having low thermal expansion characteristics as the raw material include said three kinds of the ceramics.

The ceramic as the raw materials also include the other ceramics which are converted to the ceramics having low thermal expansion characteristics by certain reaction in the firing.

The batch prepared by admixing the rare earth component and the other additive with the ceramic can be in a form suitable for the following fabrication and firing such as in the form of a dry mix containing no moisture which is used for a rubber press process or a hot press process, or a slurry containing water which is used for a mechanical press process, a vibration cast process and a slip cast process so as to attain the purposes.

The firing temperature is dependent upon the substance and shape of the fired ceramic having dense and low thermal expansion characteristics.

It is possible to attain the object for forming the dense fired ceramic at relatively low temperature for each firing process.

For example, the firing temperature is preferably in a range of 1,000° to 1,250° C. in the case of lithium aluminosilicates and in a range of 1,000° to 1,400° C. especially 1,300° to 1,400° C. in the case of cordierite and in a range of 1,200° to 1,600° C. in the case of aluminum titanate.

From the viewpoints of high thermal shock resistance, as one of the important objects of the present invention, it is preferable to obtain the fired ceramics having dense and low thermal expansion characteristics prepared by using at least one of the above-mentioned three kinds of the ceramics as the raw material.

EXAMPLE:

The components shown in Table 1 were admixed and each mixture was fabricated by the method shown in Table 1 to obtain each molded mixture having a size of $100^{mm} \times 50^{mm} \times 20^{mm}$.

Each molded mixture was fired at the temperature shown in Table 1 for about 4 hours in a siliconit type electric furnace to obtain each fired ceramic.

Table 1

| Example | 1 Ref. | 2 | 3 | 4 Ref. | 5 | 6 | 7 | 8 | 9 Ref. | 10 | 11 | 12 | 13 |
|---|---|---|---|---|---|---|---|---|---|---|---|---|---|
| Components (wt.%) | | | | | | | | | | | | | |
| cordierite *1 | 100 | 99 | 97 | 90 | 98 | 98 | | | 90 | 87 | 99.5 | 93.5 | 97 |
| β-spodumene*2 | | | | | | | 98 | | | | | | |
| aluminum titanate *3 | | | | | | | | 98 | | | | | |
| $Y_2O_3$ *4 | | 1 | 3 | 10 | | | 2 | 2 | | 3 | 0.5 | 6.5 | 3 |
| $CeO_2$ *4 | | | | | 2 | | | | | | | | |
| $La_2O_3$ *4 | | | | | | 2 | | | | | | | |
| clay | | | | | | | | | 10 | 10 | | | |
| 1% aq. sol. of PVA (to total of above components) | | | | | | | | | 38 | 38 | | | |
| 30% aq. sol. of sodium lignin sulfonate (to total of above components) | 10 | 10 | 10 | 10 | 10 | 10 | 10 | 10 | | | | | |
| Fabrication | press | press | press | press | press | press | press | press | slip cast | slip cast | press | press | press |
| Firing temperature (°C.) | 1360 | 1360 | 1360 | 1360 | 1360 | 1360 | 1100 | 1500 | 1360 | 1360 | 1360 | 1360 | 1360 | note:
*1 Cordierite:
The cordierite was prepared by completely melting a mixture of suitable amounts of silica, Bayer-alumina and magnesia clinker in an electric furnace and charging the molten mixture into water to quench it to obtain a granular glassy composition (MgO = 13-15%, $Al_2O_3$ = 34-36% and $SiO_2$ = 50-52% and other component = less than 1%) (main component of $2MgO . 2Al_2O_3 . 5SiO_2$ crystals) and then, heat treating the glassy composition at 1370° C. for 6 hours and pulverizing the product into the powder (less than 100 mesh)
*2 β-spodumene:
The β-spodumene: as $Li_2O . Al_2O_3 . 4SiO_2$ crystals was prepared by molding a mixture comprising 93 wt. parts of pyrophyllite, 7 wt. parts of lithium carbonate ($Li_2CO_3$) and sintering it at 1300° C. and pulverizing the product into the powder (less than 200 mesh).
*3 Aluminum titanate:
The aluminum titanate was prepared by mixing 54 wt. parts of Bayer-alumina, 38 wt. parts of anatase type $TiO_2$, 2 wt. parts of $Fe_2O_3$, 1.5 wt. parts of $SnO_2$ and 4.5 wt. parts of silica and press-molding the mixture and sintering it at 1530° C. for 3 hours and pulverizing the product into the powder (less than 150 mesh).
*4 $Y_2O_3$, $CeO_2$ and $La_2O_3$:
The oxides of $Y_2O_3$, $CeO_2$ and $La_2O_3$ (purity of higher than 90%; less than 325 mesh) were used in most of the examples. Yttrium nitrate was used as $Y_2O_3$ in Example 13.

The results of the characteristics of the fired ceramics obtained by using the compositions shown in Table 1 are shown in Table 2.

Table 2

| Examples | 1 Ref. | 2 | 3 | 4 Ref. | 5 | 6 | 7 | 8 | 9 Ref. | 10 | 11 | 12 | 13 |
|---|---|---|---|---|---|---|---|---|---|---|---|---|---|
| Porosity (%) | 20.4 | 6.9 | 2.3 | 1.8 | 4.6 | 3.8 | 9.8 | 5.3 | 20.3 | 2.1 | 10.0 | 1.9 | 2.1 |
| Transverse strength (kg/cm$^2$) | 150 | 312 | 451 | 470 | 380 | 403 | 480 | 250 | 125 | 483 | 230 | 468 | 460 |
| Thermal expansion coefficient (%) | 0.223 | 0.231 | 0.256 | 0.356 | 0.245 | 0.248 | 0.118 | 0.047 | 0.215 | 0.250 | 0.225 | 0.286 | 0.251 |

From the viewpoints of the objects of the present invention, it is not preferable to use, as main component, the ceramics having high thermal expansion coefficient of higher than $4 \times 10^{-6}/°$ C. at 1000° C. such as alumina and magnesia or non-oxide type ceramics having low oxidation resistance such as SiC and $Si_3N_4$. The fired ceramics having dense and low expansion characteristics means the ceramics having a thermal expansion coefficient of less than $4 \times 10^{-6}/°$ C. at 25° to 1000° C. and especially, the ceramics having a main component selected from the group consisting of lithium aluminosilicates, cordierite and aluminum titanate, though the present invention is not limited to use one of the three ceramics as the raw material.

As it is clear from the results of Table 2, the fired ceramic of Reference 1 had not enough density as those of Examples 2 and 3.

The fired ceramic of Reference 4 had high density but it had remarkably high thermal expansion coefficient which causes a trouble in the practical use.

The fired ceramic of Reference 9 had not enough density and had relatively low strength whereas these disadvantages were not found in the case of Example 10 (3% of $Y_2O_3$ addition).

When the composition of Example 9 was further fired at higher temperature such as 1420° C. so as to increase the density. As the result, the density was increased but serious deformation of the fired ceramic was caused.

EXAMPLE 14:

A composition was prepared by admixing 18 wt. parts of vinyl acetate solution with a mixture of 97 wt. parts of cordierite powder (*1) and 3 wt. parts of $Y_2O_3$ powder (*4) and the composition was press-molded to form a sheet and fired at 1360° C. for about 4 hours in the same electric furnace to obtain a fired ceramic for measuring electric characteristics.

The fired ceramic had the following characteristics suitable for insulation substrates such as micro-wave insulation substrate and hot substrate.

Porosity: 0.3%;
Transverse strength 1,100 kg/cm$^2$;
Thermal expansion coefficient 0.20%;
Electric characteristics;
Insulating strength at room temperature: 14 KV/mm$^2$
Volume specific resistance: higher than $10^{16}$ Ω at 20° C.; higher than $10^{12}$ Ω at 500° C.
(cf. $Al_2O_3$.: about $10^{11}$ Ω at 500° C.)
Dielectric constant ($\epsilon$)
1MH$_z$ 5.0
10MH$_z$ 5.0

In accordance with the present invention, the fired ceramics having a thermal expansion coefficient of less than 0.3% at 25°–1000° C. (less than $3 \times 10^{-6}$/° C.) and a porosity of less than 10% preferably less than 5% and high strength for practical uses and excellent electric characteristics can be easily obtained. These fired ceramics can be used in various usages such as various substrates, engineering ceramics, heat-exchanger parts, radiant heating part, etc.

What is claimed is:

1. A fired dense ceramic possessing low thermal expansion characteristics, consisting essentially of: from 0.3 to 8 wt. % of at least one rare earth oxide selected from the group consisting of $Y_2O_3$ and $CeO_2$ in cordierite, said fired ceramic having a thermal expansion coefficient less than 0.3% at 25° C. to 1000° C. and having a porosity less than 10%.

2. The fired ceramic according to claim 1 wherein the rare earth oxide is $Y_2O_3$.

3. The fired ceramic according to claim 1 wherein the content of the rare earth oxide is in a range of 1 to 4%.

* * * * *